(12) United States Patent
Mooraj et al.

(10) Patent No.: US 12,392,952 B2
(45) Date of Patent: Aug. 19, 2025

(54) ILLUMINATED PANE-LIKE GLASS ELEMENT HAVING REDUCED EMITTANCE VIA THE LATERAL EDGE

(71) Applicant: SAINT-GOBAIN GLASS FRANCE, Courbevoie (FR)

(72) Inventors: Semjon Mooraj, Herzogenrath (DE); Tobias Nielsen, Herzogenrath (DE); Buyin Yu, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/832,488

(22) PCT Filed: May 10, 2023

(86) PCT No.: PCT/EP2023/062430
§ 371 (c)(1),
(2) Date: Jul. 23, 2024

(87) PCT Pub. No.: WO2023/237279
PCT Pub. Date: Dec. 14, 2023

(65) Prior Publication Data
US 2025/0102722 A1    Mar. 27, 2025

(30) Foreign Application Priority Data
Jun. 10, 2022  (EP) .................................. 22178301

(51) Int. Cl.
*F21V 8/00* (2006.01)
(52) U.S. Cl.
CPC ......... *G02B 6/0035* (2013.01); *G02B 6/0021* (2013.01); *G02B 6/0065* (2013.01);
(Continued)

(58) Field of Classification Search
CPC .. G02B 6/0088; G02B 6/0095; G02B 6/0073; G02B 6/0065; G02B 6/0021; G02B 6/0035
See application file for complete search history.

(56) References Cited

U.S. PATENT DOCUMENTS

2009/0278448 A1  11/2009  Tchakarov
2015/0298601 A1  10/2015  Bott et al.

FOREIGN PATENT DOCUMENTS

CN   103328207 A  *  9/2013  ............. B32B 17/02
DE   102011016433 A1   10/2012
(Continued)

OTHER PUBLICATIONS

Espace Net FR2899954A1 Description Translation (Year: 2024).*
(Continued)

*Primary Examiner* — Anabel Ton
(74) *Attorney, Agent, or Firm* — Steinfl + Bruno, LLP (57) ABSTRACT

An illuminated glass element, including a glass pane with a first surface, a second surface, and a side edge face extending therebetween. The glass pane is equipped with at least one light source, which is suitable for coupling light into the glass pane such that the light propagates in the glass pane, in particular by total reflection at the first surface and the second surface. The glass pane is provided with at least one light-scattering structure, which is suitable for coupling said light out of the glass pane via the first surface and/or via the second surface. The glass pane is also provided, in a peripheral edge region, at least in sections, with a light trap, which is suitable for reducing the emission of the light via the side edge face. The light trap is formed from a light-scattering or light-diffracting layer on the first surface and an opaque element on the second surface.

20 Claims, 5 Drawing Sheets (52) U.S. Cl.
CPC ......... *G02B 6/0073* (2013.01); *G02B 6/0088* (2013.01); *G02B 6/0095* (2013.01)

(56) References Cited

FOREIGN PATENT DOCUMENTS

| | | | |
|---|---|---|---|
| FR | 2899954 A1 | 10/2007 | |
| WO | 2014/060409 A1 | 4/2014 | |
| WO | WO-2014167291 A1 * | 10/2014 | ....... B32B 17/10036 |
| WO | WO-2015118280 A1 * | 8/2015 | ....... B32B 17/10005 |
| WO | 2023/169736 A1 | 9/2023 | |
| WO | WO-2025027100 A1 * | 2/2025 | |

OTHER PUBLICATIONS

Innovation Q+ NPL Search (Year: 2024).*
International Search Report issued for International Patent Application No. PCT/EP2023/062430, filed on May 10, 2023 on behalf of Saint-Gobain Glass France. Mail Date: Aug. 31, 2023. 6 pages. (English Translation and DE Original).

* cited by examiner

ILLUMINATED PANE-LIKE GLASS ELEMENT HAVING REDUCED EMITTANCE VIA THE LATERAL EDGE

CROSS-REFERENCE TO RELATED APPLICATIONS

The present application is the U.S. National Stage of International Patent Application No. PCT/EP2023/062430 filed on May 10, 2023, which, in turn, claims priority to European Patent Application No. 22178301.2 filed on Jun. 10, 2022.

The invention relates to an illuminated glass element having at least one glass pane and use thereof.

Illuminated glass panes are known per se. For illumination, a light source, typically a light-emitting diode, can be arranged on the side edge face or in a recess of the glass pane such that light can be coupled into the glass pane via the side edge face or the edge face of the recess and propagates there as a result of total reflection. The light can be coupled out of the glass pane again by light-scattering structures, thus realizing the illumination. The shape of the light-scattering structures can be freely selected such that illuminated areas of any shape, for example, as patterns, can be generated. Illuminated glass panes of this type are known, for example, from WO2014/060409A1 or WO2014/167291A1.

In the vehicle sector, such illuminated glass panes are of interest, in particular as roof panels by means of which the interior can be illuminated. The illuminated glass pane is typically the inner pane of a composite pane. However, such illuminated glass panes can also be used for other vehicle panes or even panes in the building and architecture sector or in fixtures. Instead of illuminating an interior, the illuminated areas formed by the light-scattering structures can also be used to display information, for example, to display directional arrows, status indicators, warnings, price lists, or the like, or aesthetic patterns can be generated.

With conventional illuminated glass panes of this type, there is the problem that part of the light propagates all the way to the peripheral side edge of the glass pane and is coupled out there. Therefore, not only the light-scattering structures are illuminated, but also the side edge. On the one hand, this is disturbing because the emission of light via the side edge is undesirable and is irritating for the observer or can even result in the fact that the glass pane no longer satisfies legal requirements, in particular in the area of vehicle panes, where the effects of glare on the driver or other road users must be ruled out. On the other hand, light outcoupling at the side edge can also result in a loss of light, which is then no longer available for the actual intended outcoupling at the light-scattering structures. The intensity of the illumination or the efficiency is thus reduced.

The unpublished international patent application PCT/EP2023/051960 proposes providing the side edge face with a reflecting layer that reflects the light back into the glass pane and thus prevents emission of light via the side edge face. The reflecting layer is in turn covered with an opaque material that serves both to mask and to mechanically and chemically protect the light-reflecting layer.

There is still need for illuminated glass panes of the type mentioned in the introduction in which the undesirable emission of light via the side edge face is prevented or at least reduced. The object of the present invention is to provide an illuminated glass element having such an improved illuminated glass pane.

The object of the present invention is accomplished by an illuminated glass element in accordance with claim 1. Preferred embodiments are apparent from the subclaims.

In the context of the invention, the illuminated glass element is a pane-type or plate-type object that comprises at least one glass pane and is, in particular, structurally, formed from at least one glass pane. The glass element can be a single glass pane and thus consist structurally of only said pane glass. Alternatively, the glass element can be a composite pane or an insulating glazing that contains said glass pane. In the case of a composite pane, the glass pane is joined to another pane via a thermoplastic intermediate layer. In the case of an insulating glazing, the glass pane is joined to another pane via a circumferential spacer in the edge region, forming a typically inert-gas-filled or evacuated interpane space. The glass element can be used as a window pane, for example, as a window pane of vehicles, buildings, or interiors. However, the glass element can also be used as a component of furniture or electrical appliances, for example, as a door pane of a cabinet or shelf or as an oven door pane. The glass element can also be used as such as a fixture, for example, as a display panel in bars or discotheques.

The illuminated glass element according to the invention comprises at least one glass pane. The glass pane has a first surface (primary surface) and a second surface (primary surface), which are typically implemented substantially parallel to one another, and a side edge face extending between the first and the second surface.

The glass element or the glass pane can be flat or curved in one or more spatial directions. In the latter case, typically, one of the surfaces is curved concavely and the other is curved convexly. The side edge face can be planar. It is, however, common to grind the side edge face to minimize the risk of injury therefrom. The side edge face is then curved or rounded, in particular convexly curved or rounded.

The glass pane is equipped with at least one light source suitable for coupling the light emitted by it into the glass pane such that the light propagates in the glass pane between the first surface and the second surface, in particular by total reflection at the first surface and the second surface. As is common in generic illuminated glass panes, the glass pane is provided with at least one light-scattering structure suitable for coupling said light out of the glass pane via its first surface and/or via its second surface. The light-scattering structure is arranged on the first or the second surface or makes contact with one of these surfaces. When light propagating in the glass pane strikes the light-scattering structure, it is scattered, thus preventing total reflection, such that the scattered light is coupled out of the glass pane and leaves the glass pane.

According to the invention, the glass pane is provided, at least in sections in a peripheral edge region, with a light trap suitable for at least reducing or even completely preventing the emission of the light via the side edge face of the glass pane. In other words, at least one section of the peripheral edge region of the pane is provided with the light trap. The light trap is formed from a light-scattering or light-diffracting layer on the first surface of the glass pane and an opaque element on the second surface of the glass pane. The light-scattering or light-diffracting layer and the opaque element can be applied directly to the respective surface or be in contact therewith.

In conventional illuminated glass panes, part of the light that propagates in the glass pane strikes the side edge face and is then coupled out of glass pane via the side edge face.

The light is thus also emitted via the side edge face, which is not desirable. In the glass element according to the invention, this is prevented or at least reduced by the light trap arranged in the edge region. The light-scattering or light-diffracting layer on the first surface of the glass pane interrupts the total reflection when light rays strike it. The light scattered or diffracted at said layer strikes the opaque element and is absorbed thereby. The light trap thus intercepts the light, so to speak, before it reaches the side edge face of the glass pane. At least part of the light that, without the light trap, would strike the side edge face and would be coupled out via it, is prevented from doing so by the light trap and is, so to speak, swallowed. This prevents emission via the side edge face. With a suitable design of the glass element, it is even possible to intercept all the light before it strikes the side edge face, and completely prevents the emission. This is the major advantage of the present invention.

If the glass element according to the invention is a a window pane (for example, of a vehicle, a building, of an interior, of a piece of furniture, or a fixture), it is intended to be inserted into a window opening and there to separate an interior from external surroundings. The glass pane then has an exterior-side surface and an interior-side surface. In the context the invention, "exterior-side surface" refers to that primary surface that is intended to face the external surroundings in the installation position. In the context of the invention, "interior-side surface" refers to that primary surface that is intended to face the interior in the installed position. The first surface of the glass pane (in the context the invention, that surface with the light-scattering or light-diffracting layer of the light trap) can be the exterior-side surface of the glass pane, then, the second surface (in the context of the invention, that surface with the opaque element of the light trap) is the interior-side surface. Alternatively, however, the first surface of the glass pane can also be the interior-side surface; and the second surface, the exterior-side surface.

The glass pane is provided with a light source suitable for coupling light into the glass pane. The light can be coupled in in particular via the side edge face of the glass pane, via the edge face of a recess of the glass pane, or with the help of a light coupling means via one of the surfaces of the glass pane. The light is radiated into the glass pane and strikes one of the surfaces of the glass pane, which are interfaces with an adjacent medium. The glass pane typically has a higher refractive index (for example, soda lime glass: 1.52 at a light wavelength of 589 nm) than the adjacent media (for example, the surrounding atmosphere, in particular air: 1.00 at a light wavelength of 589 nm). Since there is thus a transition from an optically denser medium to an optically less dense medium, a critical angle $\alpha_T$ of total reflection can be determined as $$\alpha_T = \arcsin\left(\frac{n_2}{n_1}\right),$$

where $n_1$ is the refractive index of the glass pane and $n_2$ is the refractive index of the surroundings. The critical angle of total reflection, for example, in the case of a soda lime glass-to-air transition and a light wavelength of 589 nm is $\alpha_T=41°$.

The light is typically radiated into the glass pane by the light source over a certain angular range. The light rays can strike a surface of the glass pane from the inside of the glass pane. A light ray strikes said surface of the glass pane at an angle of incidence that depends on the angle at which the light ray was radiated in. Two situations can be distinguished:

If the angle of incidence is smaller than the critical angle of total reflection, the light ray is refracted at the surface and most of it passes into the surroundings of the glass pane. This situation occurs in particular in the vicinity of the coupling site. Only a small part is reflected at the surface at an angle of reflection that corresponds to the angle of incidence and then strikes the opposite surface, where, again, a large part of the remaining light intensity is refracted and leaves the glass pane. This light is thus lost for the intended use, namely the illumination of the glass pane by coupling out at the light-scattering structures. The undesirable emission in the vicinity of the coupling site can optionally be prevented by an opaque element, for example, a masking print or a sticker.

If the angle of incidence is greater than the critical angle of total reflection, the light ray is totally reflected at the surface at an angle of reflection that corresponds to the angle of incidence. The light does not pass into the surroundings and, as a result of repeated total reflection, propagates in the glass pane substantially loss free, being reflected back-and-forth, as it were, between the two surfaces of the glass pane. Those portions of the light that strike the light-scattering structure are coupled out, which is the basis for the intended illumination of the glass pane. Portions of the light that are not coupled out at the light-scattering structure arrive in the edge region of the glass pane, where they are coupled out via the side edge face or are intercepted by the light trap according to the invention.

As is usual in ray optics, "angle of incidence" refers to the angle of the light ray incident on the surface relative to the surface normal of the surface at the point of incidence. The angle of reflection is also determined analogously relative to the surface normal, as is the critical angle of total reflection.

The glass pane can be mentally divided into a circumferential edge region that is adjacent to the peripheral side edge face, and a central region surrounded by the edge region. The light-scattering structure is arranged in the central region; and the light trap according to the invention, in the edge region. The edge region is arranged in a strip-like manner along the side edge face or the outline of the glass pane; it can also be referred to as an edge strip. That dimension of the edge strip that extends along the side edge face (or parallel to the side edge face) can be referred to as the length of the edge region, and that dimension that extends perpendicular to the side edge, as the width of the edge region. The width of the edge region corresponds to the extent to which the edge region emanating from the side edge face extends toward the central region. The edge region has, for example, a width of 10 cm or even of only 7 cm or 5 cm.

The light trap according to the invention is arranged in the edge region of the glass pane. However, it does not have to completely cover the edge region. The components of the light trap (light-scattering/light-diffracting layer and opaque element) do not have to extend either over the entire length or over the entire width of the edge region. The light trap extends in a strip-like manner at least over a lengthwise section of the edge region. Thus, there is at least one lengthwise section of the edge region, along which the light-scattering/light-diffracting layer and the opaque element are present, with the light-scattering/light-diffracting layer and the opaque element extending, independently of one another, over part of the width (widthwise section) of the edge region or over the entire width of the edge region. The light-scattering/light-diffracting layer and the opaque element can, independently of one another, be directly adjacent to the side edge face or be spaced apart therefrom.

The light-scattering or light-diffracting layer and the opaque element are arranged in the same lengthwise section of the edge region. However, they need not cover the same widthwise section. In other words, they need not be arranged overlapping one another when viewed through the glass pane, but can be offset from one another (relative to the width dimension of the edge region).

It is particularly advantageous for the light trap to be implemented completely circumferentially in the edge region, interrupted only at any points that serve for light coupling. Then, emission is reduced over the entire side edge. However, it is also conceivable for only one section or several sections of the edge region to be provided with the light trap, while other sections remain free. This can be selected, for example, when only the emission via part of the side edge is to be reduced.

The light-scattering or light-diffracting layer is in particular suitable for deflecting the light incident on it in the direction of the opaque element. The light deflected at the light-scattering or light-diffracting layer is (at least partially) reflected into the glass pane at an angle of reflection that is smaller than the the angle of incidence and as a result does not strike the side edge face of the glass pane, but rather the opaque element and is absorbed thereby. The light-scattering or light-diffracting layer and the opaque element are suitably positioned relative to one another for this. The width and relative arrangement of the light-scattering/light-diffracting layer and the opaque element depend on the design of the glass element in the specific applicational case. They depend, among other things, on the thickness of the glass pane, the wavelength of the light, the material of the glass pane and the surroundings, and the design and the refractive index of the light-scattering or light-diffracting layer.

The light-scattering or light-diffracting layer is formed in a strip-like manner and extends along (one section of) the side edge of the first surface, in particular parallel to the side edge. In other words, the light-scattering or light-diffracting layer extends in a strip-like manner along at least one section of the side edge face of the glass pane. Analogous to the edge region, that dimension of the light-scattering or light-diffracting layer that extends along the side edge can be referred to as the length of the light-scattering or light-diffracting layer, and that dimension that extends perpendicular to the side edge can be referred to as the width. The width of the light-scattering or light-diffracting layer is preferably constant. For its part, the strip-like light-scattering or light-diffracting layer has two side edges that extend along the length dimension and delimit the width dimension. One of these side edges faces the side edge of the first surface and the other side edge faces away from the side edge of the first surface.

The width of the light-scattering or light-diffracting layer is preferably from 10 mm to 65 mm, particularly preferably from 30 mm to 50 mm. The side edge of the light-scattering or light-diffracting layer facing the side edge of the first surface preferably has a distance of 0 mm to 35 mm from the side edge of the first surface, particularly preferably from 5 mm to 20 mm or from 10 mm to 20 mm. This distance can also be referred to as the distance of the light-scattering or light-diffracting layer from the side edge face. At a distance of 0 mm, the light-scattering or light-diffracting layer is directly adjacent to the side edge of the first surface. At a distance of more than 0 mm, the light-scattering or light-diffracting layer is spaced away from the side edge of the first surface such that there is a region of the first surface between the light-scattering or light-diffracting layer and the side edge of the glass pane that is not occupied by the light-scattering or light-diffracting layer. The side edge of the light-scattering or light-diffracting layer facing away from the side edge of the first surface preferably has a distance of 10 mm to 100 mm from the side edge of the first surface, particularly preferably of 35 mm to 70 mm.

The light-scattering or light-diffracting layer is in direct contact with the first surface of the glass pane in order to exert its effect. It can be applied directly to the first surface. If the glass element is a composite pane in which the first surface of the glass pane faces the intermediate layer, it can also be applied to that surface of the thermoplastic intermediate layer that faces the first surface of the glass pane and is in contact therewith. Alternatively, it can be inserted between the first surface of the glass pane and the intermediate layer.

In one embodiment of the invention, the light-scattering or light-diffracting layer is implemented as an optical grating. Optical gratings are periodic structures for diffracting light (diffraction gratings). They have parallel line-like structures by which a plurality of slits are formed. Gratings act by diffraction of light: the light of the individual slits interferes and forms an interference pattern. This causes the light to be deflected, with the magnitude of the deflection depending on the wavelength of the light and the grating constant. The grating constant is the period of the grating, i.e., the distance between adjacent line-like structures. The grating constant and the geometric arrangement of the optical grating and of the opaque element are suitably matched to one another taking into account the wavelength of the light source such that the greatest possible proportion of the light diffracted at the grating strikes the opaque element. The optical grating is in particular a reflection grating. In reflection gratings, diffraction effects are produced by reflection from an appropriately prepared reflecting layer. The line-like structures can, for example, be introduced into a suitable (reflecting) substrate by etching, scribing, or by exposure. The optical grating is preferably provided as a finished component and attached to the first surface. Optical gratings are available commercially and can be purchased. The optical grating can be adhesively bonded, for example, to the first surface. In the case of a composite pane in which the first surface of the glass pane faces the intermediate layer, the optical grating can be inserted between the first surface of the glass pane and the thermoplastic layer. Alternatively, however, it is also possible to provide the first surface with a suitable (reflective) coating and to form the optical grating therein. The coating can be, for example, a dielectric layer sequence or a layer sequence with metal-containing layers; the grating can be formed, for example, by laser patterning of the coating.

In a further embodiment of the invention, the light-scattering or light-diffracting layer is implemented as an imprint. The imprint can be printed directly onto the first surface of the glass pane. In the case of a composite pane, in which the first surface of the glass pane faces the intermediate layer, the imprint can, alternatively, be printed onto that surface of the thermoplastic layer that faces the first surface of the glass pane and is in contact therewith.

The imprint acts in particular as a light-scattering structure. This can be realized in any way, for example, by light-scattering additives in the printing paste. Suitable light-scattering additives are, for example, glass frits, which can, optionally, be baked into the first surface of the glass pane. Glass beads or other particles in the micron range can also be used as light-scattering additives.

The color of the imprint is irrelevant. Therefore, any pigments or dyes can optionally be added to the printing paste.

In a further embodiment of the invention, the light-scattering or light-diffracting layer is implemented as a microprism film. A microprism film comprises a substrate (in particular, a flexible substrate, for example, in the form of a plastic film) with a flat arrangement of a plurality of prisms with dimensions in the micron range. The microprisms act in particular as reflection prisms and reflect the light striking them at an angle of reflection that deviates from the angle of incidence, in particular is smaller than the angle of incidence such that the light is deflected onto the opaque element. Due to the dimensions in the micron range, diffraction and refraction also occur on the prisms such that the microprism film can be regarded as a light-scattering or light-diffracting layer. The microprism film is preferably provided as a finished component and attached on the first surface. Microprism films are available commercially and can be purchased. The microprism film can, for example, be adhesively bonded to the first surface. In the case of a composite pane, in which the first surface of the glass pane faces the intermediate layer, the microprism film can be inserted between the first surface of the glass pane and the thermoplastic layer.

The edge length of the individual microprisms is preferably from 10 μm to 250 μm, particularly preferably from 20 μm to 100 μm, for example, about 30 μm, 50 μm, or 70 μm. In a particularly advantageous embodiment, the microprism film is provided with a light-reflecting coating, for example, a silver coating or a dielectric layer sequence. The coating is applied to the surface of the microprism films facing away from the glass pane to enhance the reflective effect. Instead of a flexible microprism film, a rigid plastic sheet with a flat arrangement of microprisms can also be used.

In a further embodiment of the invention, the light-scattering or light-diffracting layer is implemented as a structured coating. The structured coating is preferably a microperforated dielectric thin-film coating. An $SiO_2$ coating is particularly preferred. The coating preferably has a layer thickness of less than 1 μm, particularly preferably from 50 nm to 500 nm. "Microperforation" means (in particular periodic) interruptions of the coating with dimensions in the nanometer or micron range, introduced into the coating, for example, by laser processing. The light-scattering or light-diffracting effect of such a coating is based, in particular, on local differences in the refractive index. The coating can be applied directly on the first surface of the glass pane, for example, by chemical or physical vapor deposition. In the case of a composite pane, in which the first surface of the glass pane faces the intermediate layer, the coating can, alternatively, be applied to that surface of the thermoplastic intermediate layer that faces the glass pane and is in contact therewith. Alternatively, the coating can be provided prefabricated on a carrier film, for example, a PET film, and inserted between the first surface of the glass pane and the intermediate layer.

The opaque element is, in particular, suitable for (at least partially) absorbing the light deflected at the light-scattering or light-diffracting layer. The opaque element is strip-like and extends along (a region of) the side edge of the second surface, in particular parallel to the side edge. In other words, the opaque element extends in strip-like manner along at least one section of the side edge face of the glass pane. Analogous to the edge region and the light-scattering or light-diffracting layer, that dimension of the opaque element that extends along the side edge can be referred to as the length of the opaque element, and that dimension that extends perpendicular to the side edge can be referred to as the width. The width of the opaque element is preferably constant. For its part, the strip-like opaque element has two side edges that extend along the lengthwise dimension and delimit the width dimension. One of these side edges faces the side edge of the second surface, and the other side edge faces away from the side edge of the second surface.

The opaque element is preferably arranged at least in the same lengthwise section of the edge region as the light-scattering or light-diffracting layer. This means that the opaque element has at least the same length as the light-scattering or light-diffracting layer and is arranged such that the opaque element completely overlaps the light-scattering or light-diffracting layer. The opaque element can have the same length as the light-scattering or light-diffracting layer and can be arranged in the same lengthwise section of the edge region, with the opaque element and the light-scattering or light-diffracting layer extending completely along said lengthwise section. However, the opaque element can also extend beyond the light-scattering or light-diffracting layer on one or both sides with respect to the lengthwise dimension. In both cases, the light deflected at the light-scattering or light-diffracting layer can be effectively absorbed by the opaque element.

The side edge of the opaque element facing the side edge of the second surface particularly preferably has a distance of 0 mm from the side edge of the second surface, i.e., is preferably directly adjacent to the side edge of the second surface or the side edge face. However, the opaque element can also be spaced away from the side edge of the second surface, preferably by at most 20 mm such that the distance of the side edge of the opaque element facing the side edge of the second surface to the side edge of the the second surface is preferably from 0 mm to 20 mm. This distance can also be referred to as the distance of the opaque element from the side edge face. The required width of the opaque element is governed in particular by the light-deflecting effect of the light-scattering or light-diffracting layer. Typically, the side edge of the opaque element facing away from the side edge of the second surface can have a distance from the side edge of the second surface that is less than the distance of the side edge of the light-scattering or light-diffracting layers that faces away from the side edge of the first surface from the side edge of the first surface. In this case, the opaque element extends less far toward the central region of the glass pane than the light-scattering or light-diffracting layer, which is typically sufficient for the light at the light-scattering or light-diffracting layer to be deflected toward the side edge face at an angle of reflection which, although smaller than the angle of incidence, is still greater than zero. However, the opaque element can extend just as far or even farther toward the central region than the light-scattering layer such that the side edge of the opaque element facing away from the side edge of the second surface has a distance from the side edge of the second surface that is equal to or even greater than the distance of the side edge of the light-scattering or light-diffracting layers that faces away from the side edge of the first surface from the side edge of the first surface.

In typical applications, the distance of the side edge of the opaque element facing away from the side edge of the second surface to the side edge of the second surface is from 20 mm to 100 mm. The width of the opaque element is, for example, from 10 mm to 100 mm, preferably from 20 mm to 70 mm.

The opaque element is preferably attached directly to the second surface of the glass pane. In one embodiment of the invention, the opaque element is implemented as an imprint on the second surface of the glass pane. In this case, a printing paste containing a pigment or a dye is applied to the second surface by any printing method, for example, by screen printing or pad printing. The pigment or the dye causes the opacity of the opaque element and is in sufficient quantity such that the opaque element is not transparent with respect to the light of the light source deflected at the light-scattering or light-diffracting layer, but, instead, absorbs said light. The color of the opaque element is irrelevant. A black color can be preferred for aesthetic reasons, but, in principle, the opaque element can be of any color.

The printing paste can be dried after printing and adhere to the glass pane in a purely adhesive manner. However, an enamel-type imprint can also be used, as is customary as a so-called masking print in vehicle panes. In this case, the printing paste contains glass frits that are baked into the glass surface after printing, thus providing a particularly stable bond with the glass surface.

In a further embodiment of the invention, the opaque element is implemented as an opaque component made of rubber or plastic that is attached, for example, glued, to the second surface of the glass pane. The opaque component can, like a film, be flexible, elastic, or even rigid.

In principle, also conceivable as an opaque element are opaque coatings that are applied to the second surface of the glass pane, for example, by chemical or physical vapor deposition.

In the case of a composite pane, in which the second surface of the glass pane faces the intermediate layer, the opaque element can also be formed on that surface of the thermoplastic intermediate layer that faces the glass pane and is in contact therewith (for example, as an opaque imprint) or can be inserted between the intermediate layer and the second surface of the glass pane (for example, as an opaque component made of rubber or plastic).

When operating, the light source emits visible light, i.e., electromagnetic radiation in the visible spectral range, in particular in the range from 380 nm to 780 nm. The light source can have one or more emission bands that is/are arranged in the visible spectral range and covers/cover a proportion thereof. However, the light source can also have one wide emission band that covers the entire visible spectral range. The emission band(s)—and thus the color of the emitted light—can be freely selected according to the requirements of the specific applicational case.

The glass pane can contain a single light source or even multiple light sources whose light is coupled into the glass pane at different points. The light of the light source can be coupled into the glass pane directly or via an optical element, for example, a lens.

The light source is preferably a light-emitting diode (LED). The electroluminescent material of the light-emitting diode can be, for example, an inorganic semiconductor or an organic semiconductor. In the latter case, it is also referred to as an organic light-emitting diode (OLED).

The light of the light source can be coupled into the glass pane in various ways, with three embodiments preferred in particular.

In a first preferred embodiment, the light source is associated with a recess in the glass pane. I.e., the glass pane has a recess. This recess is preferably a hole, i.e., a through-hole, that extends between the first and the second surface of the glass pane. However, the recess can alternatively also be a depression of the blind hole type (sack-like depression) that extends into the glass pane starting from the first surface or the second surface, without, however, reaching the opposite primary surface, which would result in a through-hole. The blind hole preferably extends, starting from one surface into the glass pane, forming an exposed surface of the glass element according to the invention. The light source can then be subsequently inserted and easily replaced in the event of a defect. In the case of a composite pane, that surface of the glass pane that faces away from the intermediate layer is the exposed surface. The recess can, for example, be produced in the glass pane by mechanical drilling or by laser processing. The recess is preferably round, but can, in principle, have any shape, for example, even a polygonal shape. This means the base surface of the recess is in the plane of the at least one surface of the glass pane, via which the recess is introduced into the glass pane. The recess has, overall, the shape of the cylinder, preferably a right cylinder. The cylinder is preferably a circular cylinder (circular base surface), but can also have any other base surfaces, for example, an elliptical base surface (elliptical cylinder) or a polygonal base surface (prism).

The recess, be it a through-hole or a depression, is delimited by a circumferential edge face that extends between the primary surfaces of the glass pane. In the case of a through-hole, this is the only boundary surface of the recess. In the case of the sack-like depression, there is a further boundary surface that faces that primary surface of the glass pane to which the depression does not extend and which forms, so to speak, the bottom of the blind hole. If the glass element includes multiple light sources, a dedicated recess is provided for each light source. However, multiple light sources with, for example, different emission colors, can be arranged in the same recess.

In this embodiment, the light source is associated with said edge face of the recess and is suitable for coupling light into the glass pane via this edge face. For this purpose, the light source itself can be arranged in the recess such that it is situated in the plane defined by the glass pane and the emitted light strikes the edge face directly. For this purpose, the light source can, for example, be clamped into the recess or glued to the edge face. It is also conceivable for the light source to be situated in a housing or a holder and to be fixed there, with the housing or holder being inserted into the recess, preferably with a precise fit. Alternatively, it is also possible for the light source not to directly irradiate the edge face, but, instead, the radiation is first deflected for this purpose. Thus, it is conceivable for the light source to be situated in a housing, with part of the housing inserted into the recess while another part of the housing is situated outside the recess. The light source is positioned in the part of the housing outside the recess and the light is deflected by reflecting surfaces or waveguides in the housing such that it irradiates the edge face of the recess. Said housing is preferably attached to an exposed surface of the glass pane and extends from there into the recess.

In this embodiment, the light trap, i.e., the light-scattering or light-diffracting layer and the opaque element, is particularly preferably formed completely circumferentially in the edge region. This means that the light-scattering or light-diffracting layer and the opaque element extend in each case along the entire length of the edge region and are implemented in each case in a frame-like manner without interruption. There is thus no lengthwise section that is not provided with the light-scattering or light-diffracting layer and the opaque element. This reduces or prevents the emission of light via the entire side edge, which is particularly advantageous.

In a second preferred embodiment, the light source is associated with one of the two surfaces of the glass pane. The light source is arranged on one of the surfaces and radiates light into the glass pane via this surface. A light coupling means is arranged on the other surface opposite the light source, which light coupling means is suitable for coupling the light striking the light coupling means through the glass pane into the glass pane via said other surface (i.e., the surface on which the light coupling means is arranged). The light coupling means can, for example, be implemented as a microprism film, as a structured plastic film, or as a plastic sheet with a flat arrangement of microprisms. The light coupling means reflects the light back into the glass pane, but at a modified angle that deviates from 0° relative to the surface normal. The light is refracted at the surface of the glass pane and at least part of the resulting light in the glass pane strikes the opposite surface at an angle of incidence greater than the critical angle of total reflection, as a result of which the light is coupled into the glass pane.

The light source is preferably arranged on an exposed surface of the glass pane or the glass element such that it can be attached subsequently and can be easily replaced in the event of a defect.

In this embodiment as well, the light trap, i.e., the light-scattering or light-diffracting layer and the opaque element, is particularly preferably implemented completely circumferentially in the edge region. This reduces or prevents the emission of light via the entire side edge, which is particularly advantageous.

In a third preferred embodiment, the light source is associated with the side edge face of the glass pane and is suitable for coupling light into the glass pane via the side edge face. The light emitted by the light source can strike the side edge face directly. The light source can be situated at the side of the inner pane in the plane defined by the glass pane. For this purpose, the light source can be attached directly to the side edge face, for example, glued or clamped. Alternatively, the light source can also be situated in a housing or a holder and fixed there, with the housing or the holder being attached to the glass pane, for example, glued or clamped, such that the light source irradiates the side edge face. However, it is also possible for the light source not to irradiate the side edge face directly, but the radiation is first deflected for this purpose. Thus, it is conceivable for the light source to be situated in a housing that contains reflecting surfaces or waveguides by which the beam path of the light is shaped. This housing is attached to the glass pane such that the beam path guides the light to the side edge face of the glass pane. The light source itself does not then have to be situated to the side of the glass pane in the plane defined by the glass pane, but can, for example, be arranged in front of or behind the glass pane in the direction of through-vision. Said housing is preferably attached to an exposed surface of the glass pane and extends out from there to the side edge face of the glass pane.

In this embodiment, the light trap, i.e., the light-scattering or light-diffracting layer and the opaque element, is particularly preferably implemented circumferentially in the edge region and is interrupted only at the point or points at which the light from the light source(s) is coupled into the glass pane. Each light source is thus associated with a lengthwise section of the edge region of the glass pane via which the light is coupled. The light-scattering or light-diffracting layer and the opaque element are not present in these lengthwise sections. All other lengthwise sections of the edge region are provided along their entire length with the light-scattering or light-diffracting layer and the opaque element. This reduces or prevents the emission of light via the entire side edge, because it is prevented from radiating out by the side edge either by the light trap or the light source.

A combination of the above-described embodiments is also conceivable, wherein there are multiple light sources whose light is coupled into the glass pane in different ways.

If the light of the light source is coupled in via the side edge face of the glass pane or via the edge face of a recess of the glass pane, in a particularly advantageous embodiment, a central diaphragm is arranged between the light source and the side edge face or the edge face of the recess. A central diaphragm is a diaphragm that blocks a central region of the beam cone of the light source such that a central region of the side edge face or edge face is not irradiated with light. The side edge face or edge face can then be divided into three regions, with two regions (edge regions) arranged adjacent to a surface of the glass pane in each case and the third region (said central region) arranged between the two other sections. The light is coupled in via at least one of the edge regions, preferably via both.

The beam cone of the light source can be divided into three angle groups:
  a first angle group, in which the light is coupled into the glass pane such that it strikes the surfaces of the glass pane at an angle of incidence smaller than the critical angle of total reflection such that it is not subject to total reflection and is lost via the surfaces;
  a second angle group, in which the light is coupled into the glass pane such that it strikes the surface of the glass pane at an angle of incidence greater than the critical angle of total reflection and consequently propagates in the glass pane by total reflection, with the angle of incidence, however, sufficiently small that the light strikes the light-scattering or light-diffracting layer before it reaches the side edge face of the glass pane; the beam trap acts on this angle group and prevents or reduces emission via the side edge face;
  a third angle group, in which the light is coupled into the glass pane such that it
    a) passes through the glass pane and leaves again at the opposite side edge face, without having struck a surface of the glass pane, or
    b) strikes the surface of the glass pane at an angle of incidence greater than the critical angle of total reflection, but is so large that after a few total reflections the light reaches the opposite side edge face without hitting the light-scattering or light-diffracting layer (the light-scattering or light-diffracting layer is skipped, so to speak); the beam trap cannot act on this angle group.

The central diaphragm is preferably dimensioned such that the light of the third angle group is partially or completely blocked. Thus, the emission of light via the side edge face of the glass pane can be further reduced.

The glass pane is also provided with a light-scattering structure suitable for coupling the coupled-in light out of the glass pane via the first and/or the second surface. For this purpose, the light-scattering structure makes direct contact with one of the surfaces such that the light propagating in the glass pane strikes it. The light-scattering properties of the light-scattering structure prevent total reflection. The light-scattering structure is, so speak, a scattering center at which the light is scattered and, consequently, is not totally reflected. Since the scattering is basically nondirectional, at least part of the scattered light leaves the glass pane. As a result, illumination can be realized or information can be displayed.

The area of the glass pane occupied by the light-scattering structure appears to the observer as a luminous area. This can be used, for example, for illumination (for example, of an interior) or for realizing a display for presenting information or for creating aesthetic luminous surfaces or patterns. The luminous structure can be present in a single continuous region of the glass pane or even in multiple regions separated from one another. Any shapes or patterns can be created using the light scattering structure. In particular, the light-scattering structure is arranged in the central region of the glass pane, which is surrounded by the edge region with the light trap.

The light-scattering structure can be applied directly to or formed on the first or the second surface of the glass pane. Alternatively, the light-scattering structure can be provided, for example, on a carrier film that is attached to the first or the second surface, for example, by adhesive bonding. If the glass element according to the invention is a composite pane, the light-scattering structure can be applied to the surface of the thermoplastic intermediate layer making contact with the glass pane. Alternatively, the light-scattering structure (for example, applied to a carrier film) can be inserted between the glass pane and the intermediate layer.

In an advantageous embodiment, the light-scattering structure is implemented as an imprint, in particular as an imprint on one of the surfaces of the glass pane or-in the case of a composite pane-on the surface of the intermediate layer facing the glass pane. An imprint on the glass pane is preferably implemented as light-scattering enamel. This enamel can, for example, be screenprinted. It preferably contains glass frits that are baked into the surface of the glass pane, creating a roughened and, consequently, light-scattering surface. An imprint on the intermediate layer can be realized by printing on a surface of a thermoplastic film with a light-scattering printing paste, for example, by screen printing. During manufacture of the composite pane, the film is inserted between the outer and the inner pane to form the intermediate layer, with the printed surface facing the glass pane, in particular with direct contact with the glass pane. In an advantageous embodiment, the light-scattering structure is transparent such that through-vision through the glass pane is not substantially restricted. Consequently, the imprint (the enamel or printing paste) preferably contains no pigment. However, opaque or semitransparent light-scattering structures with pigments are also conceivable, for example, white structures.

Light-scattering structures can, however, also be formed by roughening the relevant surface of the glass pane or the intermediate layer. This roughening can be done mechanically (for example, by grinding techniques) or also by laser processing. Laser processing has, in particular in the case of a composite pane, the advantage that the light-scattering structure can also be introduced into the finished laminated composite pane, even if it is to be situated within the laminated pane since laser radiation can also be focused even on a plane in the interior of the composite pane, for example, through the transparent glass pane. In addition, with laser processing, it is possible to form the light-scattering structure not on a surface, but in the interior of the glass pane.

The glass pane is preferably made of soda lime glass, which is customary for window panes. However, the glass pane can, in principle, also be made of other types of glass (for example, borosilicate glass, quartz glass, aluminosilicate glass). The thickness of the glass pane can vary widely. Preferably used are panes with a thickness in the range from 0.5 mm to 10 mm, preferably from 1 mm to 5 mm. The glass pane is preferably clear so the light can advantageously propagate in the inner pane.

In a further development of the invention, the glass element according to the invention is a composite pane. The composite pane comprises, in addition to the glass pane, a further pane, that is joined to the glass pane via a thermoplastic intermediate layer. The further pane also has a first surface, a second surface, and a peripheral side edge face extending therebetween. If the glass element is a window pane, one of the panes can be referred to as an outer pane and the other pane as an inner pane. In the context of the invention, "inner pane" refers to the pane of the composite pane facing the interior in the installed position. "Outer pane" refers to the pane facing the external surroundings. The interior-side surface of the outer pane and the exterior-side surface of the inner pane face one another and the thermoplastic intermediate layer and are joined to one another by the thermoplastic intermediate layer.

In principle, the glass pane having the light source, the light-scattering structure, and the light trap can be the outer pane or the inner pane of the composite pane. Preferably, the glass pane is the inner pane; and the further pane, the outer pane. Thus, the interior can advantageously be illuminated. The first surface or the second surface of the glass pane can face the intermediate layer. Particularly preferably, the light-scattering structure is applied to the exterior-side surface of the glass pane (inner pane) or formed there because it is then protected in the interior of the laminate. The same is true for a light-scattering structure on the surface of the intermediate layer contacting the inner pane.

The further pane (preferably the outer pane) is preferably made of glass, in particular of soda lime glass. The further pane can, however, also be made of other types of glass (for example, borosilicate glass, quartz glass, aluminosilicate glass) or transparent plastics (for example, polymethyl methacrylate or polycarbonate). The thickness of the outer pane and the inner pane is preferably from 0.8 mm to 5 mm, preferably from 1.4 mm to 2.5 mm.

In an advantageous embodiment, the further pane (outer pane) and/or the intermediate layer are tinted. The inner pane (glass pane with light source, light-scattering structure, and light trap) is preferably clear. Then, the light can advantageously propagate in the inner pane and the illuminated light-scattering structure advantageously appears clearly in front of the tinted background. The outer pane and/or the intermediate layer are preferably tinted such that the light transmittance of the composite pane in the visible spectral range is in the range from 0% to 80%, preferably from 2% to 20%, most particularly preferably from 4% to 12%. In the case of light transmittance of 0%, the composite pane serves only for illumination, while through-vision is not possible. In a particularly advantageous embodiment, in particular when the composite pane is a vehicle roof panel, the outer pane is tinted and has light transmittance from 0% to 95% or from 2% to 80%, the intermediate layer is tinted and has light transmittance from 0% to 95% or from 2% to 80%, and the inner pane is clear and has light transmittance of more than 80%, in particular more than 90%.

The thermoplastic intermediate layer comprises at least one ply of a thermoplastic bonding material that preferably contains ethylene vinyl acetate (EVA), polyvinyl butyral (PVB), or polyurethane (PU) or mixtures or copolymers or derivatives thereof, particularly preferably PVB. The intermediate layer is typically formed from at least one thermoplastic film. The thickness of the film is preferably from 0.3 mm to 2 mm, with the standard thicknesses of 0.36 and 0.76 particularly common. The intermediate layer can also comprise multiple plies of thermoplastic materials and, for example, be formed from multiple polymer films arranged flat atop one another.

The composite pane preferably has an opaque masking region, through which no through-vision as possible. This masking region is preferably arranged circumferentially in an edge region of the composite pane and surrounds a central transparent through-vision region in a frame-like manner. This is, in particular, common for vehicle panes. This edge region need not coincide with the edge region that was used for the description of the light trap. The masking region is preferably formed by an opaque masking print that is particularly preferably applied at least to the interior-side surface of the outer pane.

The invention further includes a method for producing an illuminated glass element according to the invention. The glass pane is provided and
  provided with the at least one light-scattering structure,
  provided with the light-scattering or refracting layer of the light trap,
  provided with the opaque element of the light trap, and
  equipped with the light source.

The individual steps can be carried out in any order. Often, the light source is attached in a final step, in particular if this is accessible via an exposed surface of the otherwise finished glass element.

If the glass element is a composite pane, the glass pane is joined to a further pane via a thermoplastic intermediate layer. Then, it is also possible for the light-scattering structure and either the light-scattering or light-diffracting layer or the opaque element not to be applied to the glass pane, but, instead, to be applied to the intermediate layer, or to be inserted between the intermediate layer and the glass pane, as has already been described above. The light source is preferably not applied until after the lamination of the composite pane.

Methods known per se can be used for the lamination, for example, autoclave methods, vacuum bag methods, vacuum ring methods, calender methods, vacuum laminators, or combinations thereof. The bonding of the outer pane and the inner pane is usually done under the action of heat, vacuum, and/or pressure.

The invention further comprises the use of a glass element according to the invention as a window pane of a vehicle. A particularly preferred use is a vehicle roof panel that is used for illumination of the vehicle interior. The vehicle can, in principle, be any land vehicle, watercraft, or aircraft, and is preferably a passenger car, truck, or rail vehicle. The glass element can also be used in buildings, for example, as a window pane, glass façade, or glass door in the exterior or the interior region, in particular as a window pane of a building or of an interior. The glass element can also be used as a component of furniture, electrical appliances, as a component of fixtures, or as a fixture.

The invention is explained in detail in the following with reference to drawings and exemplary embodiments. The drawings are a schematic representation and are not to scale. The drawings in no way restrict the invention.

They depict.

Figure 1:
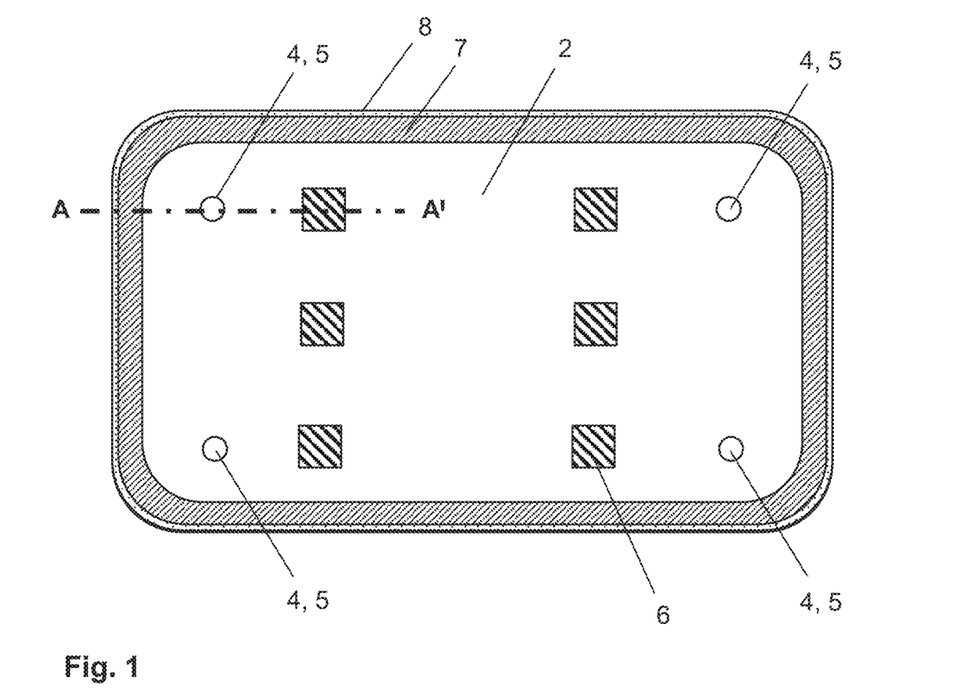
FIG. 1 a plan view of a first embodiment of the glass element according to the invention,
  FIG. 2 a cross-section along A-A' through the glass element of FIG. 1,
  FIG. 3 a plan view of a second embodiment of the glass element according to the invention,
  FIG. 4 a cross-section along B-B' through the glass element of FIG. 3,
  FIG. 5 a plan view of a third embodiment of the glass element according to the invention,
  FIG. 6 a cross-section along C-C' through the glass element of FIG. 5,
  FIG. 7 a schematic representation of the beam path within the glass pane of a glass element according to the invention,
  FIG. 8 a schematic representation of the beam path in the region of the light trap of a glass element according to the invention,
  FIG. 9 a cross-section through a further embodiment of the glass element according to the invention,
  FIG. 10 a cross-section through a further embodiment of the glass element according to the invention.
Figure 2:
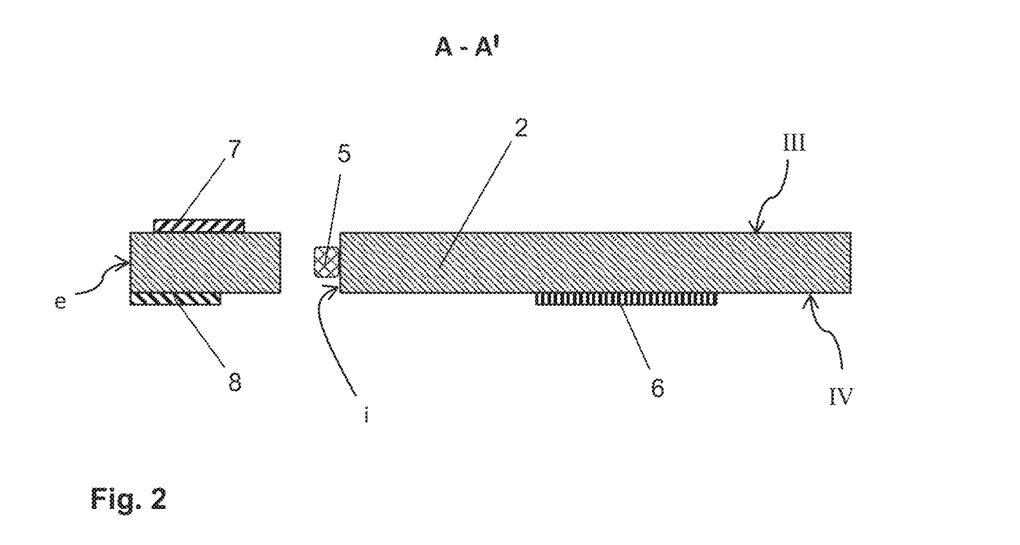

FIG. 1 and FIG. 2 depict in each case a detail of a first embodiment of the glass element according to the invention. The glass element is implemented as a single glass pane and structurally formed from a single glass pane 2. The glass pane 2 is made of soda lime glass and has, for example, a thickness of 2.1 mm. The glass pane 2 is shown planar, but can, depending on the intended use, be curved cylindrically or spherically. The glass pane has two parallel primary surfaces, namely a first surface III and a second surface IV, and a side edge face e extending therebetween. For simplicity, the side edge face e is shown planar, but in reality is often convexly rounded as a result of edge grinding.

The glass pane 2 is provided with four recesses 4, which, as through-holes, extend completely through the glass pane 2, i.e., from its first surface III all the way to its second surface IV. These recesses 4 have, for example, a circular base surface and are delimited by a circumferential edge face i. The recesses 4 have in each case overall the shape of a circular cylinder, with the edge face i forming the lateral surface and the base surfaces of the cylinder provided by the entry and exit of the recess in the first surface III or the second surface IV. In each case, a light source 5, which is, for example, glued to the edge face i, is inserted in the recesses 4. The light sources 5 are implemented, for example, as light-emitting diodes (LED). In operation, they emit visible light that is coupled into the glass pane 2 via the edge face i and propagates there as a result of total reflection on its surfaces III, IV. Light scattering structures 6 made of a transparent enamel are also printed on the second surface IV of the inner pane 2. When the light of the light source 5 strikes these light-scattering structures 6, it is scattered and thus coupled out the glass pane 2. The light-scattering structures 6 appear to a observer as luminous surfaces that can be used, for example, for illumination.

In addition to the radiation components that strike the light-scattering structures 6, in conventional panes of this type, those radiation components that strike the side edge face are also coupled out. Thus, the side edge face e also emits radiation which is undesirable and can be disturbing.

In order to reduce the undesirable emission via the side edge face e, a completely circumferential light trap is formed in an edge region of the glass pane 2. The light trap is formed by a light-scattering or light-diffracting layer 7 on the first surface III and an opaque element 8 on the second surface IV. When the light in the glass pane 2 reaches said edge region, it is scattered or diffracted at the light-scattering or light-diffracting layer 7, as a result of which the total reflection is interrupted. The light is at least partially deflected toward the opaque element 8 by which it is absorbed. Consequently, the light does not reach the side edge face e or reaches it to a lesser extent, as a result of which emission via the side edge face e is prevented or at least reduced.

The light-scattering or light-diffracting layer 7 and the opaque element 8 extend in each case in a strip-like manner, completely circumferentially along the outline of the glass pane 2, in particular parallel to the perimeter. The strips are in each case delimited by two sides edges, with one side edge facing the side edge face e of the glass pane 2 and the other side edge facing away from the side edge face e. The light-scattering or light-diffracting layer 7 has, for example, a width (strip width, distance between said side edges) of 30 mm. The side edge facing the side edge face e has a distance of, for example, 10 mm from the side edge face e. Correspondingly, the side edge facing away from the side edge face e has a distance of, for example, 40 mm from the side edge face e. The light-scattering or light-diffracting layer 7 is thus spaced as a whole away from the side edge face e. The opaque element 8 has, for example, a width (strip width, distance between said side edges) of 30 mm. The opaque element is directly adjacent to the side edge face e. The side edge facing the side edge face e thus has a distance of 0 mm from the side edge face e. Correspondingly, the side edge facing away from the side edge face e has a distance of, for example, 30 mm from the side edge face e.

The light-scattering or light-diffracting structure 7 can, for example, be implemented as an optical grating or as a microprism film and can be glued to the first surface III. Alternatively, the light-scattering or light-diffracting structure 7 can be implemented as a scattering imprint on the first surface III, similar to the light-scattering structures 6 for coupling light out. The opaque element 8 can, for example, be an opaque imprint on the second surface IV or a glued-on opaque component made of rubber or plastic.

FIG. 1 depicts a plan view of the first surface III of the glass pane 2. The light-scattering structures 6 and the edge region of the opaque element 8 are discernible in through-vision through the transparent glass pane 2.

Figure 3:
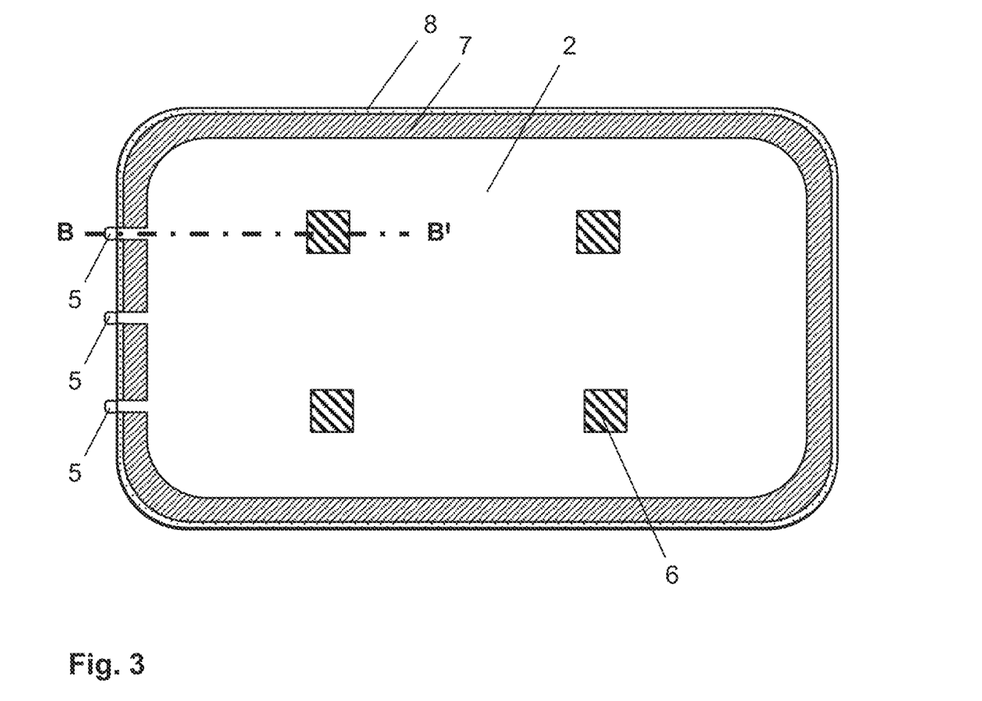
Figure 4:
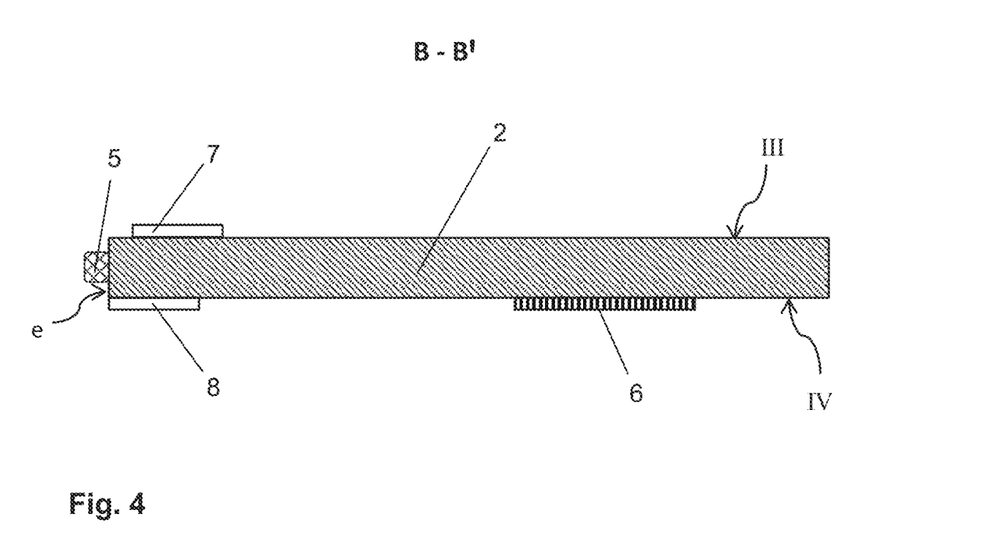

FIG. 3 and FIG. 4 depict in each case a detail of a a second embodiment of the glass element according to the invention. The glass element corresponds essentially to that of FIGS. 1 and 2, with the single glass pane 2, the light-scattering structures 6, and the light trap consisting of the light-scattering or light-diffracting layer 7 and the opaque element 8, which are implemented the same as in the first embodiment. The second embodiment differs from the first embodiment in the type of light coupling and the geometric arrangement of the light trap.

Three light sources 3 are attached, for example, glued, to the side edge face e of the glass pane 2 and couple light in via the side edge face e, which light then propagates as a result total reflection on the surfaces III, IV in the glass pane 2. The light sources 5 are also implemented here, for example, as light-emitting diodes (LED). Those sections of the edge region of the glass pane 2 that are adjacent to the sections of the side edge face e with the light sources 5 are not provided with the light trap. The light-scattering or light-diffracting layer 7 and the opaque element 8 are arranged completely circumferentially in the edge region, but are interrupted at the points at which the light coupling occurs. The light coupling is thus not disrupted by the light trap, which would prevent the total reflection. When the light reaches the side edge face e after passing through the glass pane 2, the undesirable emission via the side edge face e is prevented or at least reduced by the light trap.

FIG. 3 again depicts a plan view of the first surface III of the glass pane 2. The light-scattering structures 6 and the edge region of the opaque element 8 are discernible in through-vision through the transparent glass pane 2. The section line B-B' runs through an interruption of the light trap such that the light-scattering or light-diffracting layer 7 and the opaque element 8 are discernible in FIG. 4 behind the section plane and are consequently not shown hatched.

Figure 5:
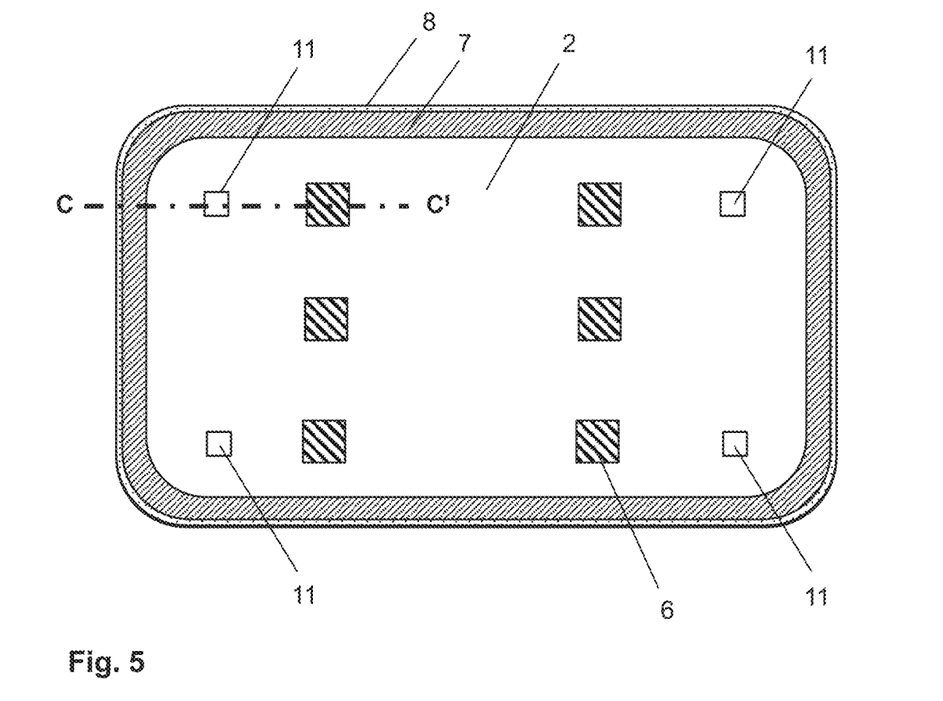
Figure 6:
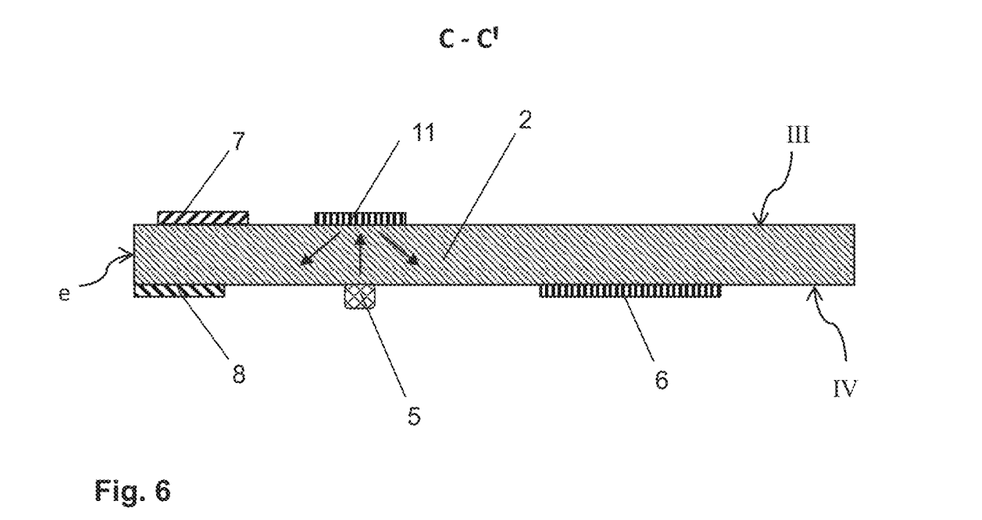

FIG. 5 and FIG. 6 depict in each case a detail of a third embodiment of the glass element according to the invention. The glass element corresponds essentially to that of FIGS. 1 and 2, with the individual glass pane 2, the light-scattering structures 6, and the light trap consisting of the light-scattering or light-diffracting layer 7 and the opaque element 8, which are implemented in the same way as in the first embodiment. The second embodiment differs from the first embodiment in the type of light coupling.

Four light sources 5 are attached, for example, glued, to the second surface IV of the glass pane 2. Opposite each light source 5, a light coupling means 11, implemented, for example, as a microprism film, is attached to the first surface III. The light coupling means 11 are irradiated through the glass pane 2 by the light sources 5. The light then reenters the glass pane 2 with a modified beam angle via the first surface III and propagates therein by total reflection. The light is thus coupled into the glass pane 2 by means of the light coupling means 11 via the first surface III. The light radiation is indicated by arrows in the figure.

In order to reduce the undesirable emission via the side edge face e, a completely circumferential light trap is implemented in an edge region of the glass pane 2. The light trap is formed completely circumferentially in the edge region of the glass pane 2 in order to reduce the emission of the light via the side edge face e. The light-scattering or light-diffracting layer 7 and the opaque element 8 are not interrupted in any lengthwise section of the edge region.

FIG. 5 again depicts a plan view of the first surface III of the glass pane 2. The light-scattering structures 6 and the edge region of the opaque element 8 can be discerned in through-vision through the transparent glass pane 2.

Figure 7:
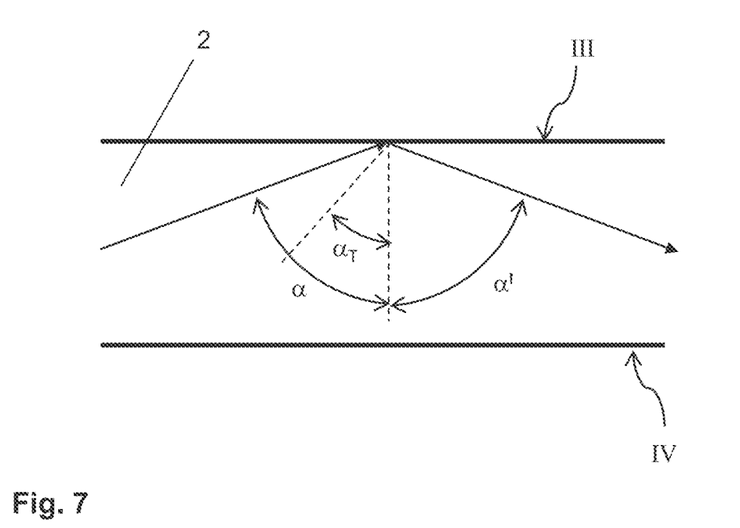

FIG. 7 illustrates the propagation of the light of the light source 5 in the glass pane 2. From the interior of the glass pane 2, the light strikes its surfaces III, IV, which are interfaces from an optically denser to an optically less dense medium. Consequently, there is a critical angle &T of total reflection, which is obtained from the refractive index $n_1$ of the glass pane 2 and the refractive index $n_2$ of the surrounding air as $\alpha_T = \arcsin(n_2/n_1)$. The critical angle $\alpha_T$ is, at a wavelength of 589 nm, for example, 41° for a transition from soda lime glass ($n_1$=1.52) to air ($n_1$=1.0).

Parts of the light coupled into the glass pane 2 strike the surfaces III, IV of the glass pane at an angle of incidence $\alpha$, which is greater than the critical angle $\alpha_T$. These light rays are totally reflected at an angle of reflection $\alpha'$, which is equal in magnitude to the angle of incidence $\alpha$. The reflection at the first surface III is shown. The incident and the reflected light ray are indicated by arrows. The reflected light ray passes through the glass pane 2 again all the way to the second surface IV, which it again strikes at the angle of incidence $\alpha$, such that it is totally reflected again. The propagation of the light in the glass pane 2 would continue in this way until the light either strikes the light-scattering structures 6 and is coupled out via the surfaces III, IV (which is desirable) or reaches the side edge face e and is emitted via the side edge face e (which is undesirable).

The angle of incidence a and the angle of reflection α' are referenced to the surface normal of the reflecting surface, as is common practice.

Figure 8:
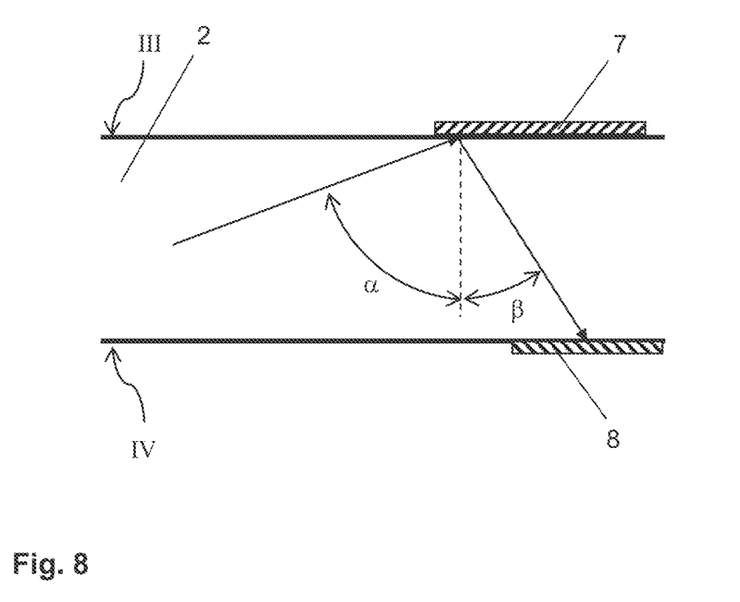

FIG. 8 illustrates the effect of the beam trap according to the invention to reduce the undesirable emission by the side edge face e. In the edge region of the glass pane 2, the light strikes the light-scattering or light-diffracting layer 7. This prevents total reflection. At least parts of the light are reflected back into the glass pane 2 by the light-scattering or light-diffracting layer 7 at an angle of reflection B that is significantly smaller than the angle of incidence α. The light ray is thus deflected toward the opaque element 8 by which it is absorbed. The light trap thus intercepts the light at least partially before it reaches the side edge face e. Consequently, the emission via the side edge e is at least reduced.

The width and relative arrangement of the light-scattering or light-diffracting layer 7 and of the opaque element 8 can be selected in the specific applicational case such that the greatest possible proportion of the light that would reach the side edge e without the light trap is intercepted. They are a function of, among other things, the thickness of the glass pane 2, the wavelength of the light, and the material of glass pane 2 and surroundings (the wavelength and material determine the refractive indices and thus the critical angle $α_T$), the design of the light-scattering or light-diffracting layer 7 (which affects the angle of reflection β).

Figure 9:
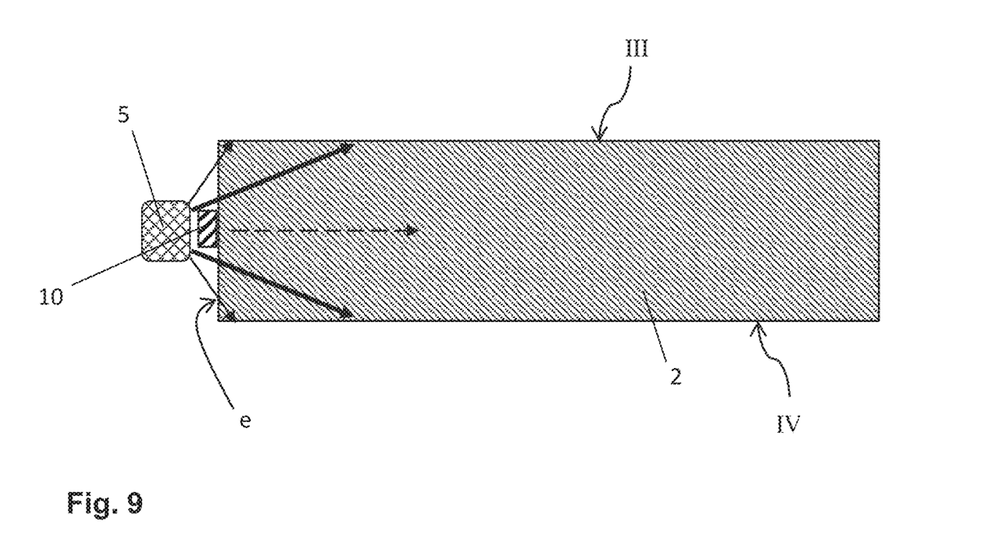

FIG. 9 illustrates a further development of the glass element according to the invention. Shown is a cross-section through a section of a glass pane 2, on the side edge face e of which a light source 5 is mounted. A central diaphragm 10 is arranged between the light source 5 and the side edge face e. The central diaphragm 10 prevents the incidence of the light on a central section of the side edge face e such that the coupling of the light takes place only via sections of the side edge face e that are directly adjacent to the surfaces III, IV and between which the central section is arranged.

The light source 5 irradiates the side edge face e in accordance with its beam cone over a certain angle range. A distinction can be made among three angle groups with regard to the coupling.

In a first angle group, the light strikes the surfaces III, IV (indicated in the figure by the thin solid arrows) in the vicinity of the side edge face e at a small angle of incidence α. The angle of incidence a is smaller than the critical angle $α_t$ of total reflection. These radiation components are not totally reflected, but are mostly refracted at the respective surface, and mostly leave the glass pane via the respective surface. Radiation reflected to a small extent strikes the opposite surface where it is again mostly refracted. The light of the first angle group is thus lost for the intended light coupling. The emission via the surfaces III, IV in the vicinity of the light source 5 can optionally be prevented, for example, by opaque imprints that absorb the radiation of the first angle group.

In a second angle group, the light (at a greater distance from the side edge face e than the light of the first angle group) strikes the surfaces III, IV (indicated in the figure by by the thick solid arrows) at a greater angle of incidence α. The angle of incidence α is greater than the critical angle $α_T$ of total reflection. The light propagates in the glass pane 2, as described above (cf. FIG. 7), and is used for the intended illumination of the light-scattering structures 6.

In a third angle group, the light would be coupled into the glass pane 2 even flatter, so to speak, than in the second angle group. The light of the third angle group would
either pass through the glass pane 2 between the surfaces III, IV and strike the side edge face e opposite the light source 5, without striking one of the surfaces III, IV and being totally reflected thereon (indicated in the figure by the dashed arrow),
or strike the surfaces III, IV of the glass pane 2 at such a large angle of incidence that it is totally reflected only a few times with the reflection points so far apart that there is no reflection point in the region of the light-scattering or light-diffracting layer 7; the light-scattering or light-diffracting layer 7 is thus, so to speak, skipped over.

In both cases, the light trap according to the invention cannot act on the radiation of the third angle group and cannot prevent emission via the side edge face e.

The central diaphragm 10 causes the light of the third angle group to be blocked and to not be coupled into the glass pane 2. As a result, the emission via the side edge e can be further reduced. The dimensions of the central diaphragm 10 are ideally selected as a function of the specific applicational case such that, on the one hand, the light of the third angle group is blocked as completely as possible and, on the other, the light of the second angle group is, as much as possible, not blocked or is blocked only to a small extent.

The principle of the central diaphragm 10 has been explained here using the example of an embodiment in which the light is coupled into the glass pane 2 via the side edge face e (as in FIGS. 3 and 4). The central diaphragm 10 can be used exactly the same way if the light is coupled in via the edge face i of a recess 4 (as in FIGS. 1 and 2).

The emission of light from the first angle group can be prevented in all embodiments by an opaque masking print, an opaque sticker, or similar opaque element in the vicinity of those locations where light is coupled in, regardless of whether the light occurs via the side edge face e, the edge face i of a recess or through a light coupling means 11 on one of the surfaces III, IV. The opaque element is arranged in the region of the surface(s) of the glass pane that is irradiated by light of the first angle group.

Figure 10:
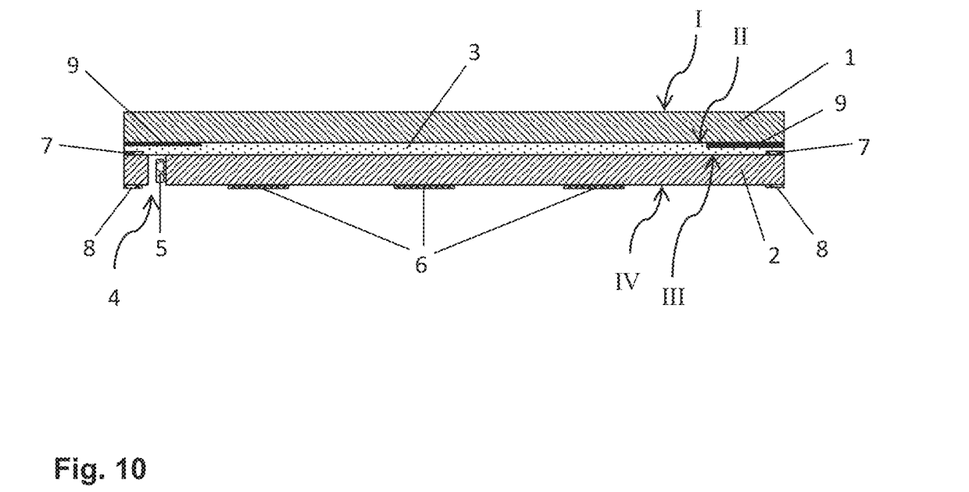

FIG. 10 depicts a cross-section through a further embodiment of the glass element according to the invention. The glass element is implemented as a composite pane. It comprises the glass pane 2, which is basically designed as in FIGS. 1 and 2, with the light source 5 in the recess 4, the light-scattering structures 6 on the second surface IV, and the light trap, which is formed from the light-scattering or light-diffracting layer 7 and the opaque element 8 circumferentially in the edge region.

The glass pane 2 is joined to a further pane 1 via a thermoplastic intermediate layer 3. The further pane 1 is likewise a pane made of soda lime glass with a thickness of, for example, 2.1 mm.

The composite pane is intended as a vehicle roof panel. For simplicity, it is shown flat, with vehicle roof panels typically being curved. The glass pane 2 is the inner pane of the composite pane, which faces the vehicle interior in the installed position. Its first surface III is its exterior-side surface, which, in the installed position, faces the further pane 1 and the external surroundings. Its second surface IV is its interior-side surface, which, in the installed position, faces the vehicle interior. The further pane 1 is the outer pane of the composite pane, which, in the installed position, faces the external surroundings. It also has a first, or outside, surface I, which, in the installed position, faces the external surroundings, and a second or interior-side surface II, which, in the installed position, faces the glass pane 2 and the vehicle interior. The interior-side surface II of the further pane 1 (outer pane) and the exterior-side surface III of the glass pane 2 (inner pane) face each other and are joined to one another via the thermoplastic intermediate layer 3. The intermediate layer 3 is formed from a single film based on PVB with a thickness of, for example, 0.76 mm. The further pane 1 and the intermediate layer 3 are, for example, tinted, whereas the glass pane 2 is made of clear glass. The total transmittance through the composite pane is, as a result of this tinting, for example, less than 5%.

The interior-side surface II of the further pane 1 is provided, in a peripheral edge region, with a masking print 9, that forms an opaque masking region of the composite pane, as is customary with vehicle panes. The recess 4 with the light source 5 is arranged in this masking region as a result of which they are advantageously inconspicuous. The same applies to the light trap comprising the light-scattering or light-diffracting layer 7 and the opaque element 8.

List of Reference Characters (1) further pane
(2) glass pane
(3) thermoplastic intermediate layer
(4) recess of the glass pane 2
(5) light source
(6) light-scattering structure
(7) light-scattering or light-diffracting layer
(8) opaque element
(9) masking print
(10) central diaphragm
(11) light coupling means
(I) first/exterior-side surface of the further pane 1
(II) second/interior-side surface of the further pane 1
(III) first surface of the glass pane 2
(IV) second surface of the glass pane 2
(e) side edge face of the glass pane 2
(i) edge face of the recess 4
$\alpha_T$ critical angle of total reflection
$\alpha$ angle of incidence of the light
$\alpha'$ angle of reflection of the light at total reflection ($\alpha=\alpha'$)
$\beta$ angle of reflection of the light emanating from the light-scattering/light-diffracting layer 7
A-A' section line
B-B' section line
C-C' section line

The invention claimed is:

1. An illuminated glass element, comprising:
a glass pane comprising a first surface, a second surface, and a side edge face extending between the first surface and the second surface,
at least one light source for coupling light into the glass pane such that the light propagates in the glass pane by total reflection at the first surface and the second surface,
at least one light-scattering structure for coupling said light out of the glass pane via at least one of: the first surface and the second surface, and
a light trap, in at least sections of a peripheral edge region of the glass pane, for reducing emission of the light via the side edge face,
wherein the light trap is formed from a light-scattering or light-diffracting layer on the first surface and an opaque element on the second surface, and
wherein the opaque element extends in the form of a strip along a region of the side edge face of the second surface.

2. The illuminated glass element according to claim 1, wherein the light-scattering or light-diffracting layer is configured to deflect the light incident thereon toward the opaque element.

3. The illuminated glass element according to claim 1, wherein the light-scattering or light-diffracting layer is an optical grating, an imprint, a microprism film, or a structured coating.

4. The illuminated glass element according to claim 1, wherein the light-scattering or light-diffracting layer extends in the form of a strip along at least one section of the side edge face with a width of 10 mm to 65 mm.

5. The illuminated glass element according to claim 1, wherein the light-scattering or light-diffracting layer extends in the form of a strip along at least one section of the side edge face with a width of 30 mm to 50 mm.

6. The illuminated glass element according to claim 4, wherein the light-scattering or light-diffracting layer has a distance to the side edge face of less than 35 mm.

7. The illuminated glass element according to claim 4, wherein the light-scattering or light-diffracting layer has a distance to the side edge face of 5 mm to 20 mm.

8. The illuminated glass element according to claim 1, wherein the opaque element is an imprint or an opaque component made of rubber or plastic.

9. The illuminated glass element according to claim 1, wherein the opaque element extends in the form of a strip along at least one section of the side edge face with a width of 10 mm to 100 mm.

10. The illuminated glass element according to claim 1, wherein the opaque element extends in the form of a strip along at least one section of the side edge face with a width of 20 mm to 70 mm.

11. The illuminated glass element according to claim 9, wherein the light-scattering or light-diffracting layer is directly adjacent to the side edge face.

12. The illuminated glass element according to claim 1, the glass pane further comprising a recess that is delimited by a circumferential edge face,
wherein:
the at least one light source is arranged in or on the recess and is configured for coupling light into the glass pane via the circumferential edge face, and
the light trap is formed completely circumferentially in the peripheral edge region.

13. The illuminated glass element according to claim 1, wherein:
the at least one light source is arranged on one of the first surface or the second surface and, opposite thereto, a light coupling structure is arranged on another of the first surface or the second surface, the light coupling structure configured for coupling the light passing through the glass pane and striking the light coupling structure back into the glass pane, and
the light trap is formed completely circumferentially in the peripheral edge region.

14. The illuminated glass element according to claim 1, wherein:
the at least one light source is arranged on the side edge face and is configured to couple light into the glass pane via the side edge face, and
the light trap is formed circumferentially in the peripheral edge region and is interrupted only where the light is coupled into the glass pane.

15. The illuminated glass element according to claim 12, wherein a central diaphragm is arranged between the light source and the circumferential edge face.

16. The illuminated glass element according to claim 14, wherein a central diaphragm is arranged between the light source and the side edge face.

17. The illuminated glass element according to claim 1, wherein the at least one light source is a light-emitting diode.

18. An illuminated glass element, comprising:
- a glass pane comprising a first surface, a second surface, and a side edge face extending between the first surface and the second surface,
- at least one light source for coupling light into the glass pane such that the light propagates in the glass pane by total reflection at the first surface and the second surface,
- at least one light-scattering structure for coupling said light out of the glass pane via at least one of: the first surface and the second surface,
- a light trap, in at least sections of a peripheral edge region of the glass pane, for reducing emission of the light via the side edge face, and
- a further pane bonded to the glass pane via a thermoplastic intermediate layer,
- wherein the light trap is formed from a light-scattering or light-diffracting layer on the first surface and an opaque element on the second surface.

19. A window pane comprising the illuminated glass element according to claim 1, wherein the window pane is a window pane of a vehicle, of a building, or of an interior.

20. The component according to claim 19, wherein the window pane is a vehicle roof panel.

* * * * *